United States Patent
Sakamoto et al.

(10) Patent No.: US 9,091,170 B2
(45) Date of Patent: Jul. 28, 2015

(54) ONE-STAGE STATOR VANE COOLING STRUCTURE AND GAS TURBINE

(75) Inventors: Yasuro Sakamoto, Takasago (JP); Eisaku Ito, Takasago (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 959 days.

(21) Appl. No.: 13/000,874

(22) PCT Filed: Dec. 24, 2009

(86) PCT No.: PCT/JP2009/007173
§ 371 (c)(1),
(2), (4) Date: Dec. 22, 2010

(87) PCT Pub. No.: WO2010/073657
PCT Pub. Date: Jul. 1, 2010

(65) Prior Publication Data
US 2011/0116937 A1 May 19, 2011

(30) Foreign Application Priority Data
Dec. 24, 2008 (JP) .................................. 2008-328621

(51) Int. Cl.
*F02C 7/12* (2006.01)
*F01D 9/04* (2006.01)
(Continued)

(52) U.S. Cl.
CPC ................ *F01D 9/041* (2013.01); *F01D 5/186* (2013.01); *F01D 9/023* (2013.01); *F02C 7/18* (2013.01); *F05D 2260/202* (2013.01)

(58) Field of Classification Search
CPC .......... F02C 3/14; F02C 3/16; F05D 2240/10; F05D 2240/12; F05D 2240/121; F23R 3/002; F23R 3/46; F01D 9/02; F01D 9/023; F01D 9/041

USPC ......... 60/805, 806, 752; 415/115, 191, 208.1, 415/208.2, 211.2; 416/96 R, 97 R
See application file for complete search history.

(56) References Cited

U.S. PATENT DOCUMENTS 2,743,579 A * 5/1956 Gaubatz ........................ 60/804
3,018,624 A 1/1962 Bonsail et al.
(Continued)

FOREIGN PATENT DOCUMENTS

CA 2633787 A1 12/2008
CN 85 1 05193 A 8/1986
(Continued)

OTHER PUBLICATIONS

Chinese Office Action issued Mar. 22, 2013, issued in corresponding Chinese Patent Application No. 200980127062.6; w/English translation (15 pages).
(Continued)

*Primary Examiner* — Devon Kramer
*Assistant Examiner* — Vikansha Dwivedi
(74) *Attorney, Agent, or Firm* — Westerman, Hattori, Daniels & Adrian, LLP (57) ABSTRACT

A one-stage stator vane cooling structure consisting of: a plurality of linking members that are provided between a plurality of combustors disposed in the circumferential direction of a gas turbine; and cooling holes that are provided in each of the one-stage stator vanes to discharge a cooling gas from the inside to the outside of the one-stage stator vanes in order to cool the one-stage stator vanes on the periphery of the stagnation line of the combustion gas flowing in from the plurality of combustors; in which the cooling holes are formed at positions that are determined according to the relative positions of the one-stage stator vanes and the linking members disposed near the one-stage stator vanes.

2 Claims, 6 Drawing Sheets

(51) Int. Cl.
*F01D 5/18* (2006.01)
*F01D 9/02* (2006.01)
*F02C 7/18* (2006.01)

(56) References Cited

U.S. PATENT DOCUMENTS

| | | | |
|---|---|---|---|
| 3,746,462 | A | 7/1973 | Fukuda |
| 5,458,461 | A | 10/1995 | Lee et al. |
| 6,036,438 | A | 3/2000 | Imai |
| 6,554,562 | B2 | 4/2003 | Dudebout et al. |
| 7,836,703 | B2 | 11/2010 | Lee et al. |
| 7,886,991 | B2 | 2/2011 | Zuo et al. |
| 8,065,881 | B2 | 11/2011 | Charron et al. |
| 2002/0184889 | A1 | 12/2002 | Calvez et al. |
| 2003/0165384 | A1 | 9/2003 | Jonsson |
| 2004/0060298 | A1 | 4/2004 | Han et al. |
| 2005/0079060 | A1* | 4/2005 | MacManus .................. 416/235 |
| 2005/0089394 | A1 | 4/2005 | Lu et al. |
| 2007/0017225 | A1 | 1/2007 | Bancalari et al. |
| 2007/0140849 | A1 | 6/2007 | Flodman et al. |
| 2009/0084082 | A1 | 4/2009 | Martin et al. |
| 2010/0071382 | A1 | 3/2010 | Liang |
| 2010/0115953 | A1 | 5/2010 | Davis, Jr. et al. |
| 2010/0122538 | A1 | 5/2010 | Ning et al. |
| 2010/0232954 | A1 | 9/2010 | Clemen |
| 2010/0313567 | A1 | 12/2010 | Nakamura et al. |
| 2011/0209482 | A1 | 9/2011 | Toqan et al. |
| 2011/0247314 | A1 | 10/2011 | Chila et al. |

FOREIGN PATENT DOCUMENTS

| | | |
|---|---|---|
| CN | 85 1 05913 A | 8/1986 |
| DE | 980363 A | 1/1965 |
| EP | 1 522 679 A2 | 4/2005 |
| GB | 980363 A | 1/1965 |
| JP | 61-006606 U | 1/1986 |
| JP | 62-121835 A | 6/1987 |
| JP | 06-017652 B2 | 3/1994 |
| JP | 2001-289003 A | 10/2001 |
| JP | 2004-116992 A | 4/2004 |
| JP | 2005-083292 A | 3/2005 |
| JP | 2005-120871 A | 5/2005 |
| JP | 2006-052910 A | 2/2006 |
| JP | 2006-105076 A | 4/2006 |
| JP | 2009-197650 A | 9/2009 |
| WO | 2009/104317 A1 | 8/2009 |

OTHER PUBLICATIONS

International Search Report of PCT/JP2009/007173, mailing date Mar. 16, 2010.
Written Opinion of PCT/JP2009/007173, mailing date Mar. 16, 2010.
Supplementary European Search Report dated May 4, 2012, issued in corresponding European Patent Application No. 09834463.3, 6 pages.
International Search Report of PCT/JP2010/058171, mailing date of Aug. 24, 2010.
Written Opinion dated Aug. 24, 2010, issued in application PCT/JP2010/058171 (10 pages).
Chinese Office Action dated Dec. 4, 2013, issued in Chinese application No. 201080044670.3 (15 pages).
European Office Action dated Feb. 11, 2015, issued in corresponding EP Patent Application No. 09834463.3 (5 pages).
US Office Action dated Mar. 26, 2015, issued in relating U.S. Appl. No. 13/500,009 (47 pages).

* cited by examiner

ONE-STAGE STATOR VANE COOLING STRUCTURE AND GAS TURBINE

TECHNICAL FIELD

The present invention relates to a one-stage stator vane cooling structure and a gas turbine equipped with this one-stage stator vane cooling structure.

Priority is claimed on Japanese Patent Application No. 2008-328621, filed Dec. 24, 2008, the content of which is incorporated herein by reference.

BACKGROUND ART

As shown for example in Patent Document 1 given below, there is conventionally known a gas turbine that generates motive power by igniting fuel with compressed air from a compressor within a plurality of combustors that are disposed in the circumferential direction of the turbine (along the axial direction), makes the combustion gas that is generated thereby flow to a turbine inlet from a transition pipe of each combustor, and successively pass through a plurality of turbine stages composed of a stator vane and a rotor vane arranged in a plurality in the circumferential direction of a combustion gas passage portion in the turbine. In this gas turbine, the rear ends of adjacent combustor transition pipes are linked by linking members that are provided in the spaces therebetween, and the transition pipe of the combustor and the turbine inlet are connected in a communicating manner so as to cause a wake flow that is formed between the transition pipes of adjacent combustors to flow to the ventral side (pressure surface side) near the leading edge of the one-stage stator vane. Thereby, it is possible to improve turbine efficiency by optimizing the relative position relationship between the combustor transition pipe and the one-stage stator vane.

High-temperature combustion gas that is flowed from the combustor transition pipe into the turbine is known to split in the vicinity of the leading edge of the one-stage stator vane to circulate along the ventral side and dorsal side, and stagnate at the branch point to create a stagnation line. At this time, since the leading edge becomes a high temperature compared to other portions as a result of the combustion gas stagnating in the vicinity of the leading edge, it is necessary to actively cool the leading edge.

Therefore, generally it is known to form cooling holes in the vicinity of the leading edge that cool the periphery of the stagnation line by discharging cooling gas to the outside.

CITATION LIST

Patent Document

[Patent Document 1] Japanese Unexamined Patent Application, first publication No. 2006-52910

SUMMARY OF THE INVENTION

Problems to be Solved by the Invention

However, in the case of a one-stage stator vane being disposed in the vicinity of the linking member, since the combustion gas flows to the one-stage stator vane from different combustors that sandwich each linking member on the dorsal side and ventral side, the position of the stagnation line due to the combustion gas ends up shifting in position due to the influence of the linking members. For that reason, the problem arises of not being able to effectively cool the vicinity of the stagnation line of the one-stage stator vane with the cooling holes that are formed near the leading edge of the one-stage stator vane.

The present invention was achieved in view of the above circumstances, and has as its object to provide a one-stage stator vane cooling structure that is capable of effectively cooling the vicinity of the stagnation line of a one-stage stator vane, and a gas turbine that is provided with this one-stage stator vane cooling structure.

Means for Solving the Problems

In order to solve the aforementioned issue, the present invention provides the following means.

The one-stage stator vane cooling structure according to the present invention is a one-stage stator vane cooling structure provided with a plurality of linking members that are provided between a plurality of combustors disposed in the circumferential direction of a gas turbine, and cooling holes that are provided in each of the one-stage stator vanes to discharge a cooling gas from the inside to the outside of the one-stage stator vanes in order to cool the one-stage stator vanes on the periphery of the stagnation line of the combustion gas flowing in from the plurality of combustors, with the cooling holes formed at positions that are determined according to the relative positions between the one-stage stator vanes and the linking members disposed in the vicinity of the one-stage stator vanes.

According to the aforementioned one-stage stator vane cooling structure, even if the stagnation line due to the combustion gas shifts in position from the leading edge under the influence of the linking member, it is possible to effectively cool that stagnation line by the cooling gas from the cooling holes.

With the positions of the linking members that are in the vicinity of the one-stage stator vanes when the stagnation line is formed on the leading edge of the one-stage stator vanes serving as a reference, the cooling holes may be formed on the ventral side than the leading edge in the case of the relative positions of the linking members in the vicinity of the one-stage stator vanes being shifted from the reference to the dorsal side of the one-stage stator vanes; and the cooling holes may be formed on the dorsal side than the leading edge in the case of the relative positions of the linking members in the vicinity of the one-stage stator vanes being shifted from the reference to the ventral side of the one-stage stator vanes.

According to this constitution, even if the stagnation line due to the combustion gas shifts in position from the leading edge to the ventral side or the dorsal side under the influence of the linking member, since the cooling holes are formed on the ventral side or the dorsal side in accordance with this position shift, it is possible to effectively cool that stagnation line by the cooling gas from the cooling holes.

The plurality of linking members are arranged with a mutually equal interval in the circumferential direction of the turbine; the one-stage stator vanes of a number that is an integer multiple of the number of the combustors are arranged with a mutually equal interval in the circumferential direction of the turbine; and the one-stage stator vanes that are closest in the circumferential direction of the turbine to the linking members are disposed so that the relative position ratio S/P that is a ratio of S to P shown below becomes greater than or equal to $-10\%$ and less than or equal to $+30\%$.

P: The pitch of the one-stage stator vanes in the circumferential direction of the turbine.

S: The distance in the circumferential direction of the turbine of the center position of the linking member in the circumferential direction that is in the vicinity with respect to the leading edge of the one-stage stator vane, the distance being a negative value in the case of the linking member that is in the vicinity shifting to the dorsal side of the one-stage stator vane, and a positive value in the case of the linking member that is in the vicinity shifting to the ventral side of the one-stage stator vane.

According to this constitution, it is possible to facilitate the flowing in to the one-stage stator vane of the wake flow that is generated on the one-stage stator vane side of the linking member by the combustion gas that is flowed out from the combustor. Accordingly, it is possible to enhance the stage efficiency of a one-stage stator vane by effectively cooling the vicinity of the stagnation line of the one-stage stator vane.

A gas turbine according to the present invention consists of a compressor that generates compressed air; a turbine that has a stator vane and a rotor vane of at least one stage each, and generates rotative power by combustion gas; and a plurality of combustors that are disposed in the circumferential direction of the turbine, linked by a plurality of linking members that are provided in the spaces therebetween, and that supply to the turbine combustion gas that is generated by supplying fuel to the compressed air that is supplied from the compressor; in which the one-stage stator vane cooling structure according to the present invention is provided in the one-stage stator vane that is positioned most to the combustor side among the stator vanes of the turbine.

Since the aforementioned gas turbine is provided with the one-stage stator vane cooling structure of the present invention, it is possible to effectively cool the vicinity of the stagnation line of the one-stage stator vane in the same manner, and it is possible to operate while preventing a rise in temperature in the vicinity of the leading edge of the one-stage stator vane.

Effects of the Invention

According to the one-stage stator vane cooling structure and gas turbine of the present invention, it is possible to effectively cool the vicinity of the stagnation line of a one-stage stator vane.

BEST MODE FOR CARRYING OUT THE INVENTION

Figure 1:
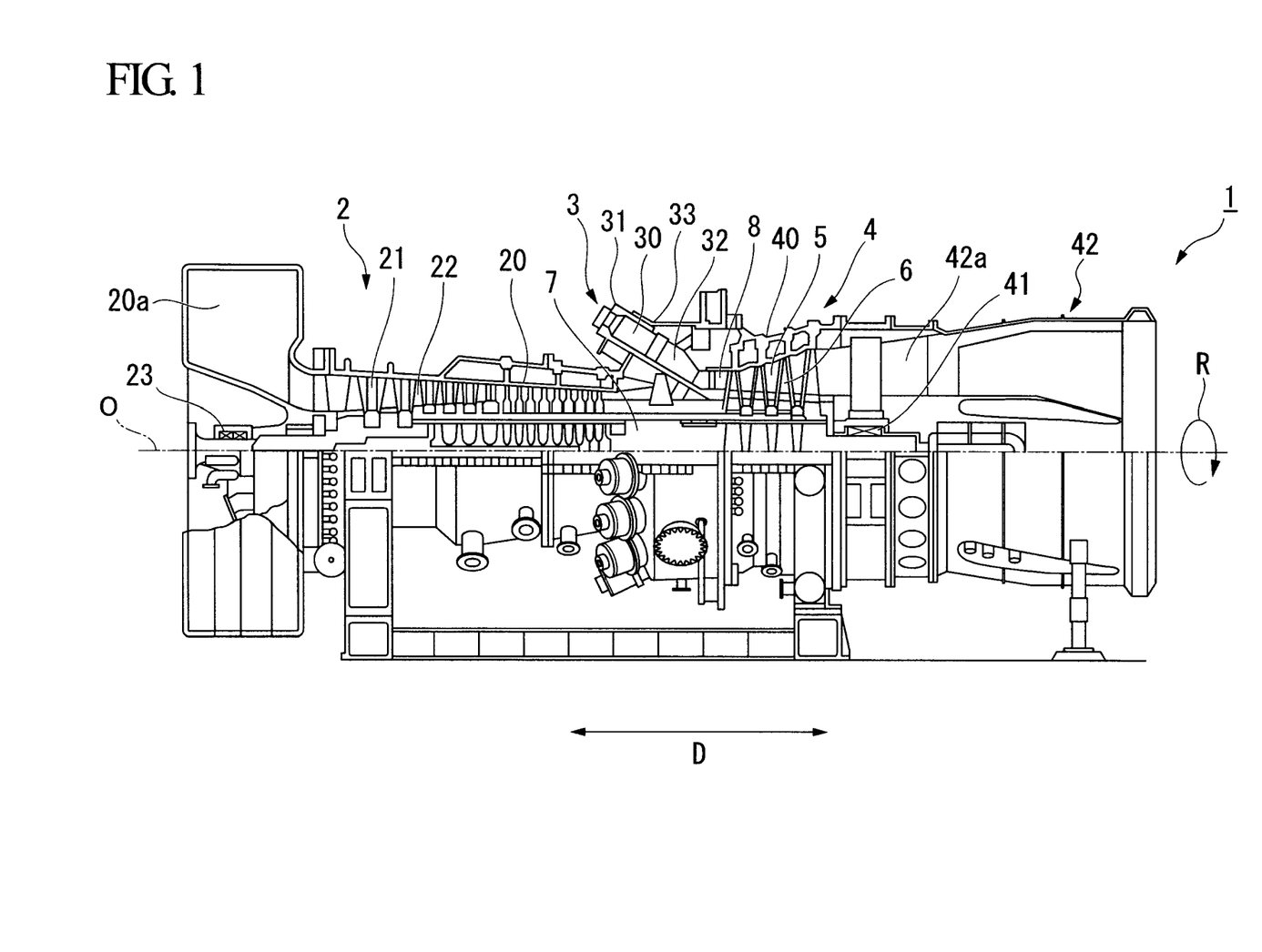
FIG. 1 is a half cross-sectional view that shows one embodiment of the gas turbine according to the present invention.

Hereinbelow, one embodiment of the present invention shall be described with reference to the drawings. FIG. 1 is a half cross-sectional view that shows one embodiment of the gas turbine according to the present invention.

As shown in FIG. 1, a gas turbine 1 is provided with a compressor 2 that generates compressed air, a plurality of combustors 3 that supply fuel to the compressed air that is supplied from the compressor 2 to generate combustion gas G1 (refer to FIG. 3), and a turbine 4 that has turbine stator vanes (stator vanes) 5 and turbine rotor vanes (rotor vanes) 6 of at least one stage, and generates rotative power with the combustion gas G1 that is supplied from the combustors 3.

In the gas turbine 1, a rotor 7 that extends in the axial direction D is integrally attached from the compressor 2 to the turbine 4, and one end of this rotor 7 is supported to be rotatable in the circumferential direction R of the turbine 4 that goes around the axial line O by a bearing portion 23 that is provided in the compressor 2, and the other end is supported to be rotatable in the circumferential direction R of the turbine 4 by a bearing portion 41 that is provided in the turbine 4. Hereinbelow, the compressor 2 side of the rotor 7 along the axial line direction D shall be referred to as the front side, and the turbine 4 side shall be referred to as the rear side.

The compressor 2 is provided with a compressor casing 20 in which an air intake 20a that takes in air is installed facing the front side, and a plurality of compressor stator vanes 21 and compressor rotor vanes 22 that are installed in this compressor casing 20.

The compressor stator vanes 21 are each fixed to the inner circumferential surface of the compressor casing 20 and provided in a manner extending to the rotor 7 side, and are arranged with a mutually equal interval in the circumferential direction R of the turbine 4. Moreover, the compressor rotor vanes 22 are fixed to the outer circumferential surface of the rotor 7 and providing in a manner extending to the inner circumferential surface of the compressor casing 20, and are arranged with a mutually equal interval in the circumferential direction R of the turbine 4. These compressor stator vanes 21 and compressor rotor vanes 22 are reciprocally disposed in multiple stages along the axial line direction D.

The combustor 3 is equipped with an inner cylinder 30 that has a burner not illustrated on the inside, an outer pipe 31 that leads the compressed air supplied from the compressor 2 to the inner pipe 30, a fuel injector not illustrated that supplies fuel to the inner pipe 30, and a transition pipe 32 that guides the combustion gas G1 from the inner pipe 30 to the turbine 4. According to the combustor 3 that is constituted in this manner, in the inner pipe 30, in the inner pipe 30 it is possible to mix the compressed air drawn from the outer cylinder 31 and the fuel supplied from a fuel injector, and generate the combustion gas G1 by burning the mixed fluid with the burner, and it is possible to lead this combustion gas G1 to the turbine 4 through the transition pipe 32.

A plurality of the combustors 3 are disposed in the circumferential direction R of the turbine 4, and the front end portion is installed in the inside of the combustor casing 33 that is linked to the rear end portion of the compressor casing 20.

The turbine 4 is provided with a turbine casing 40 of which the front end portion is linked to the rear end portion of the combustor casing 33, and the turbine stator vanes 5 and the turbine rotor vanes 6 that are installed in this turbine casing 40.

The turbine stator vanes 5 are each fixed to the inner circumferential surface of the turbine casing 40 and provided in a manner extending to the rotor 7 side, and are arranged with a mutually equal interval in the circumferential direction R of the turbine 4. Also, the turbine rotor vanes 6 are each fixed to the outer circumferential surface of the rotor 7 and provided in a manner extending to the inner circumferential surface of the turbine casing 40, and are arranged with a mutually equal interval in the circumferential direction R of the turbine 4. These turbine stator vanes 5 and turbine rotor vanes 6 are reciprocally disposed in multiple stages along the axial line direction D.

In the turbine 4 is provided a bypass passage not illustrated in which air in the compressor 2 is supplied from the compressor 2 bypassing the combustors 3. The air that is supplied to the turbine 4 through this bypass passage circulates through the inner portions of the turbine stator vanes 5 and the turbine rotor vanes 6 as cooling gas.

An exhaust chamber 42 that opens to the rear side is coupled to the rear end portion of the turbine casing 40. This exhaust chamber 42 is provided with an exhaust diffuser 42a that converts the dynamic pressure of the combustion gas G1 which has passed through the turbine stator vanes 5 and the turbine rotor vanes 6 to a static pressure.

In the gas turbine 1 that is constituted in the above manner, first air that is taken in from the air intake 20a of the compressor 2 is compressed by passing through the compressor stator vanes 21 and compressor rotor vanes 22 that are disposed in multiple stages, whereby compressed air is generated. Next, in the combustors 3, combustion gas G1 is generated from the compressed air as mentioned above, and this combustion gas G1 is led to the turbine 4. Then, by this combustion gas G1 passing through the turbine stator vanes 5 and turbine rotor vanes 6, the rotor 7 is rotatively driven, and the gas turbine 1 can output rotative power.

The exhaust gas after rotatively driving the rotor 7, upon being converted to a static pressure with the exhaust diffuser 42a of the exhaust chamber 42, it is emitted into the atmosphere.

Figure 2:
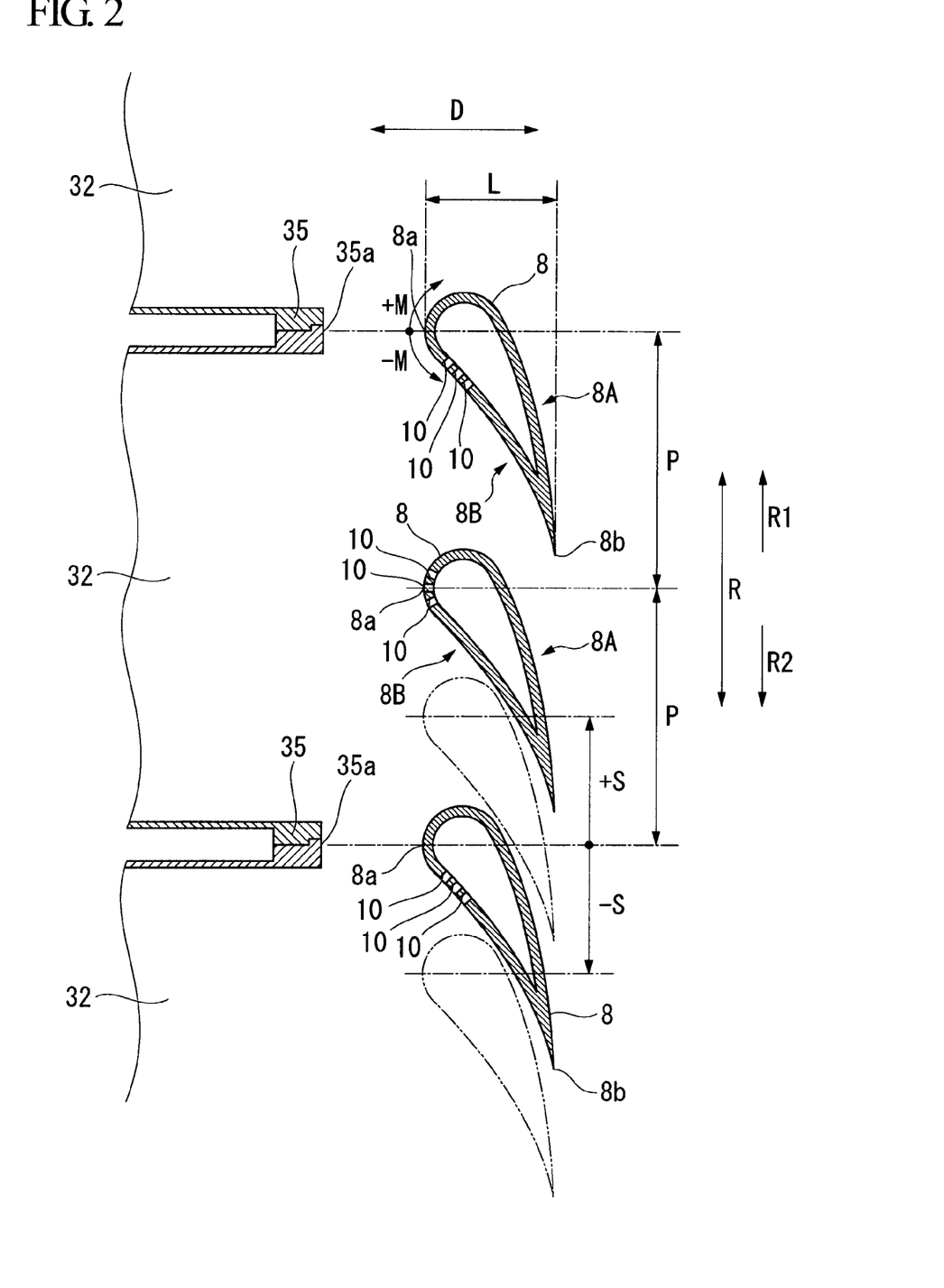
FIG. 2 is a magnified sectional view of the transition pipes of the combustors viewed from the radial direction of the rotor, and linking members and one-stage stator vanes in the gas turbine shown in FIG. 1.

Next, in the gas turbine 1 that is constituted in the above manner, the one-stage stator vane cooling structure that is positioned the most to the front side among the turbine stator vanes 5 shall be described. FIG. 2 is a magnified sectional view of the transition pipes of the combustors viewed from the radial direction of the rotor, and linking members and one-stage stator vanes in the gas turbine shown in FIG. 1.

As shown in FIG. 2, the rear ends of the transition pipes 32 of the combustors 3 that are adjacent in the circumferential direction R of the turbine 4 are linked by a plurality of linking members 35 that are provided in the spaces therebetween. Cooling gas from for example the bypass passage is supplied between the transition pipes 32 of the combustors 3 that are adjacent in the circumferential direction R of the turbine 4, whereby the transition pipes 32 are cooled. Also, the plurality of linking portions 35 are arranged with a mutually equal interval in the circumferential direction R of the turbine 4 and the rear ends of all coincide with the axial line direction D.

In the present embodiment, a one-stage stator vane 8 is provided in a number that is twice that of the combustors 3, and more specifically, for example 32 would be provided with respect to 16 of the combustors 3.

The one-stage stator vane 8 is formed with an overall streamlined shape so that a leading edge 8a side is formed with an approximately circular-arc shape that includes the leading edge 8a, and as it heads to a trailing edge 8b the width in the circumferential direction R of the turbine 4 narrows while gradually curving toward the rear side R2 in the rotation direction (the circumferential direction R of the turbine 4).

That is, with the leading edge 8a and the trailing edge 8b serving as boundaries, the outer surface of the one-stage stator vane 8 has an approximately circular-arc shape on the forward side R1 and rearward side R2 in the rotation direction, so that the forward side R1 in the rotation direction is formed in a convex surface as a dorsal side 8A, and the rearward side R2 in the rotation direction is formed in a concave surface as a ventral side 8B.

All of the leading edges 8a of the plurality of one-stage stator vanes 8 coincide with the axial line direction D, and the distance between the linking members 35 and the one-stage stator vanes 8 along the axial line direction D is constant along the entire circumference of the turbine 4 along the circumferential direction R.

A cooling hole 10 that cools the stagnation line Y that is formed on the leading edge 8a side by the combustion gas G1 is formed on the leading edge 8a side of the one-stage stator vane 8.

The cooling hole 10 is formed making the outer surface and the inner surface of the one-stage stator vane 8 continuous, and by discharging toward the outside combustion gas that is supplied to the inside, can cool the one-stage stator vane 8. In the present embodiment, a plurality of the cooling holes 10 are formed in the radial direction and circumferential direction R of the turbine 4 in each one-stage stator vane 8, and in FIG. 2, three rows are formed in the circumferential direction R.

The cooling holes 10 are formed at prescribed positions according to the relative positions of the one-stage stator vane 8 in which the cooling holes 10 are formed and the linking member 35 that is in the vicinity thereof.

As shown in FIG. 2, hereinbelow, the relative positions of the one-stage stator vane 8 and the linking member 35 are expressed by the relative position ratio S/P that is the ratio of the distance S in the circumferential direction R between the leading edge 8a of the one-stage stator vane 8 and the center position 35a of the linking member 35 in the circumferential direction to the pitch P of the one-stage stator vanes 8. The distance S is 0 in the case of the center position 35a of the linking member 35 in the circumferential direction agreeing in the approximate circumferential direction R with the leading edge 8a of the one-stage stator vane 8, is a negative value in the case of the linking member 35 shifting to the dorsal side 8A, and a positive value in the case of shifting to the ventral side 8B.

The position of the cooling hole 10 is expressed by the axial chord M/L that is the ratio of the magnitude M along the outer surface of the one-stage stator vane 8 from the leading edge 8a to the cooling hole 10 to the axial chord length L that is the magnitude in the axial line direction D from the leading edge 8a to the trailing edge 8b of the one-stage stator vane 8. The magnitude M is a negative value in the case of the cooling hole 10 being positioned on the ventral side 8B of the one-stage stator vane 8, and is a positive value in the case of the cooling hole 10 being positioned on the dorsal side 8A of the one-stage stator vane 8. As shown in the present embodiment, in the case of a plurality of rows of cooling holes 10 being arranged in the circumferential direction R, the center of the arrangement in the circumferential direction serves as the position of the cooling holes 10.

Figure 3:
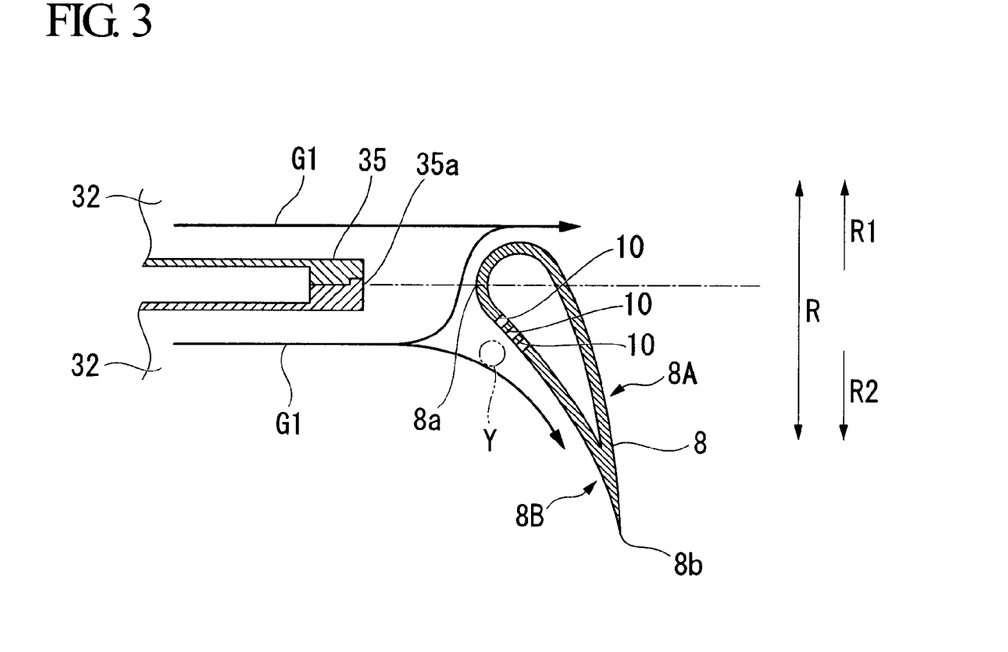
FIG. 3 is a drawing that describes the position at which the stagnation line is formed in the case of the linking member coinciding with the leading edge of the one-stage stator vane in the approximate circumferential direction.
Figure 4:
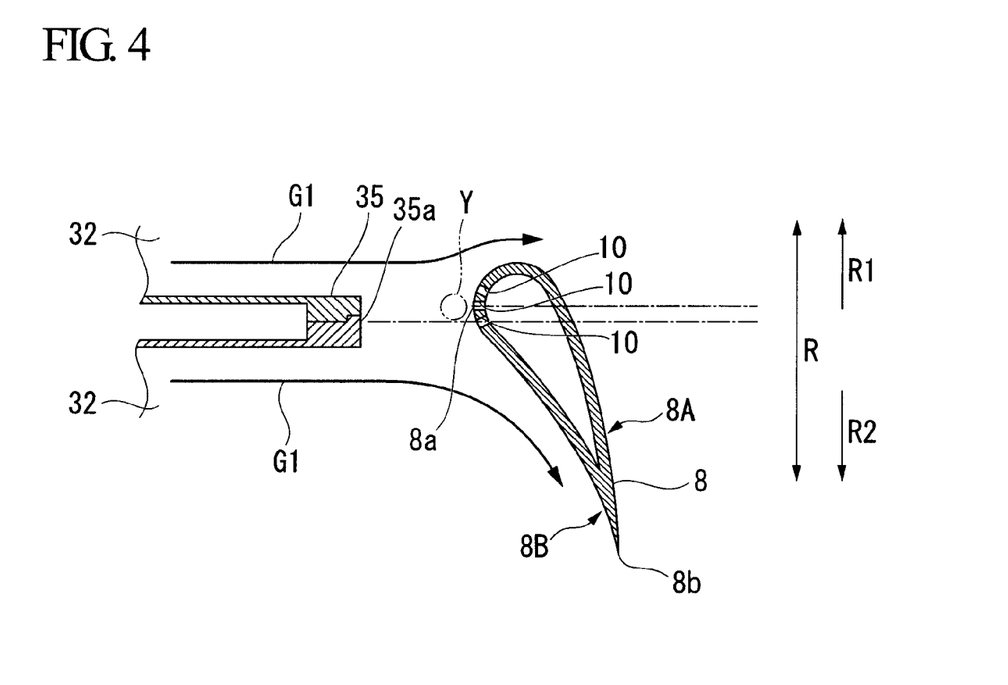
FIG. 4 is a drawing that describes the position at which the stagnation line is formed in the case of causing the linking member to move from the state shown in FIG. 3 to the ventral side with respect to the one-stage stator vane.
Figure 5:
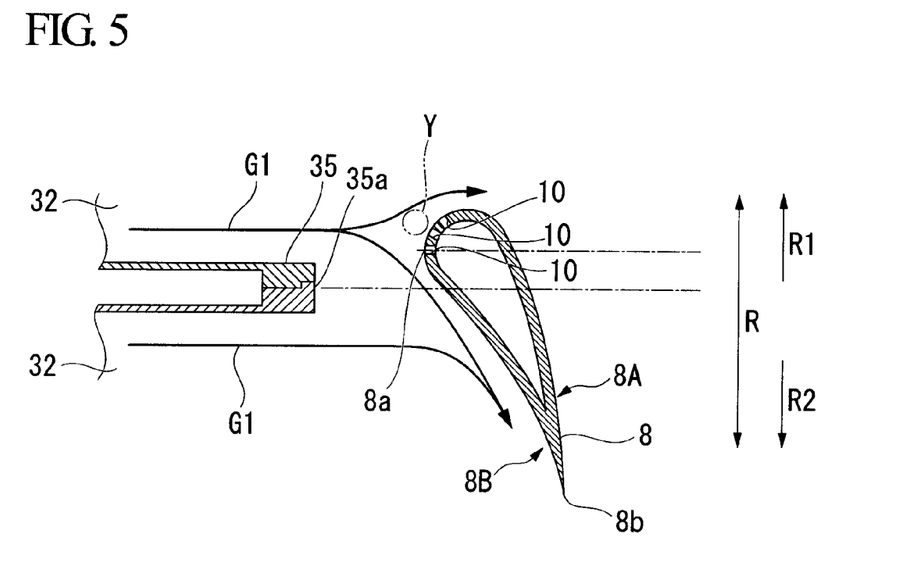
FIG. 5 is a drawing that describes the position at which the stagnation line is formed in the case of causing the linking member to move from the state shown in FIG. 4 further to the ventral side with respect to the one-stage stator vane.

In describing the position at which the cooling hole 10 is formed in the one-stage stator vane cooling structure of the present invention, first a description shall be given based on the flow of the combustion gas G1 for fluctuations in the position at which the stagnation line Y is formed according to the relative positions of the one-stage stator vane 8 and the linking member 35 in the vicinity of the one-stage stator vane 8. FIG. 3 is a drawing that describes the position at which the stagnation line is formed in the case of the linking member coinciding with the leading edge of the one-stage stator vane in the approximate circumferential direction. FIG. 4 is a drawing that describes the position at which the stagnation line is formed in the case of causing the linking member to move from the state shown in FIG. 3 to the ventral side with respect to the one-stage stator vane. FIG. 5 is a drawing that describes the position at which the stagnation line is formed in the case of causing the linking member to move from the state shown in FIG. 4 further to the ventral side with respect to the one-stage stator vane.

First, as shown in FIG. 3, in the case of the center position 35a of the linking member 35 in the circumferential direction coinciding in the approximate circumferential direction R with the leading edge 8a of the one-stage stator vane 8, that is, in the case of the relative position ratio S/P being around 0%, among the combustion gas G1 that is flowed in from the combustor 3 to the one-stage stator vane 8, the combustion gas G1 that is flowed in from the dorsal side 8A than the linking member 35 circulates as is along the dorsal side 8A of the one-stage stator vane 8. In contrast, although the combustion gas G1 that is flowed in from the ventral side 8B than the linking member 35 basically circulates as is along the ventral side 8B of the one-stage stator vane 8, when comparing the pressures of the dorsal side 8A and the ventral side 8B of the one-stage stator vane 8, since the pressure of the dorsal side 8A is lower, a portion of the combustion gas G1 diverges and is flowed in to the dorsal side 8A. Accordingly, since the combustion gas G1 branches at the ventral side 8B of the one-stage stator vane 8, the stagnation line Y is formed on the ventral side 8B than the leading edge 8a.

As shown in FIG. 4, in the case of the linking member 35 moving from the state shown in FIG. 3 to the ventral side 8B with respect to the one-stage stator vane 8, among the combustion gas G1 that is flowed in from the combustor 3 to the one-stage stator vane 8, the combustion gas G1 that is flowed in from the dorsal side 8A than the linking member 35 circulates as is along the dorsal side 8A of the one-stage stator vane 8, and the tendency of the combustion gas G1 that is flowed in from the ventral side 8B than the linking member 35 to circulate as is along the ventral side 8B of the one-stage stator vane 8 strengthens. Accordingly, as the linking member 35 moves to the ventral side 8B with respect to the one-stage stator vane 8, the flow amount to the dorsal side 8A of the combustion gas G1 that is flowed in to the ventral side 8B decreases, and as a result, the branch point of the combustion gas G1 approximately agrees with the position of the leading edge 8a, and the stagnation line Y is formed at the leading edge 8a.

As shown in FIG. 5, in the case of the linking member 35 moving from the state shown in FIG. 4 to the ventral side 8B with respect to the one-stage stator vane 8, a state results in which among the combustion gas G1 that is flowed in from the combustor 3 to the one-stage stator vane 8, that combustion gas G1 that is flowed in from the dorsal side 8A than the linking member 35 readily flows to the ventral side 8B along the outer surface of the one-stage stator vane 8. Accordingly, the stagnation line Y is formed on the dorsal side 8A than the leading edge 8a.

In consideration of the fluctuation of the position at which the stagnation line Y is formed as indicated above, in the one-stage stator vane cooling structure according to the present invention, in the case of the leading edge 8a of the one-stage stator vane 8 and the center position 35a of the linking member 35 in the circumferential direction agreeing in the approximate circumferential direction R, the cooling hole 10 is formed on the side of the ventral side 8B than the leading edge 8a. In the case of the linking member 35 moving with respect to the one-stage stator vane 8 from this state to the ventral side 8B, and the stagnation line Y being formed on the leading edge 8a, the cooling hole 10 is formed at the leading edge 8a. Moreover, in the case of the linking member 35 having moved with respect to the one-stage stator vane 8 from this state to the ventral side 8B, the cooling hole 10 is formed in the dorsal side 8A than the leading edge 8a.

According to the one-stage stator vane cooling structure as shown above, it is possible to effectively cool the vicinity of the stagnation line Y of the one-stage stator vane 8 that becomes a high temperature as a result of stagnation of the combustion gas G1 with cooling gas that is discharged from the cooling hole 10 regardless of the relative positions of the one-stage stator vane 8 and the linking member 35.

Figure 6:
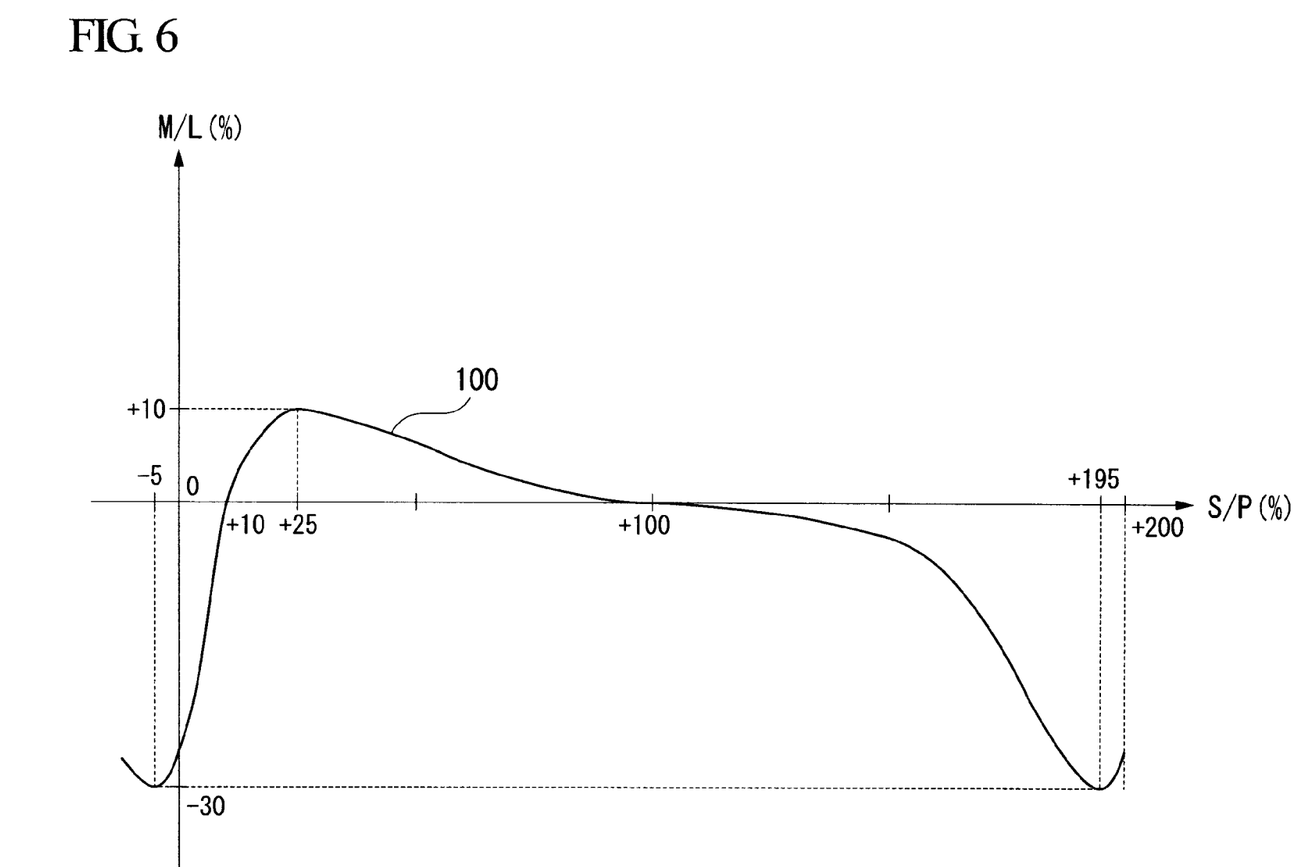
FIG. 6 is a graph that shows the relation between the relative positions of the one-stage stator vane and the linking member, and the axial chord of the cooling hole that is formed in accordance with the relative positions, in the one-stage stator vane of the gas turbine shown in FIG. 1.

Next, a detailed description shall be given for the case of applying this one-stage stator vane cooling structure to the one-stage stator vane 8 in the gas turbine 1 of the present embodiment that is formed in the shape previously described and that is separated with the linking member 35 by the aforementioned distance in the axial line direction D. Here, the description shall be given based on FIG. 6 for the relation between the relative position ratio S/P between the predetermined one-stage stator vane 8 and the predetermined linking member 35, and the axial chord M/L of the position at which the cooling hole 10 is formed in the one-stage stator vane 8, in the process of causing the one-stage stator vane 8 and the linking member 35 to move relatively, from the position at which the leading edge 8a of the one-stage stator vane 8 and the center position 35a of the linking member 35 in the circumferential direction coincide in the approximate circumferential direction R, to the position at which the leading edge 8a of the one-stage stator vane 8 and the center position 35a of another linking member 35 in the circumferential direction that is adjacent in the circumferential direction R to the linking member 35 concerned coincide in the approximate circumferential direction R. FIG. 6 is a graph that shows the relation between the relative positions of the one-stage stator vane and the linking member, and the axial chord of the cooling hole that is formed in accordance with the relative positions, in the one-stage stator vane of the gas turbine shown in FIG. 1.

As shown by the curved line 100, in the case of the center position 35a of the linking member 35 in the circumferential direction coinciding with the leading edge 8a of the one-stage stator vane 8 in the approximate circumferential direction R, that is, in the case of the relative position ratio S/P being 0%, the cooling hole 10 is formed on the ventral side 8B than the leading edge 8a. In the case of the relative position ratio S/P increasing and becoming 10%, the cooling hole 10 is formed in the leading edge 8a. In the case of the relative position ratio S/P becoming larger than +10%, the cooling hole 10 is formed on the dorsal side 8A than the leading edge 8a.

Giving a more detailed description of the graph of FIG. 6 with the case of the cooling hole 10 being formed in the leading edge 8a, that is, the case of the relative position ratio S/P being 10%, serving as a reference, in the case of the relative position ratio S/P becoming smaller than +10%, that is, in the case of the relative position of the linking member 35 that is in the vicinity with respect to the one-stage stator vane 8 having shifted to the dorsal side 8A of the one-stage stator vane 8, the axial chord M/L becomes smaller than 0%, that is, the cooling hole 10 is formed on the ventral side 8B than the leading edge 8a. The axial chord M/L of the cooling hole 10 becomes a minimum at −30% when the relative position ratio S/P is −5%.

In the case of the relative position ratio S/P becoming larger than +10%, that is, in the case of the relative position of the linking member 35 that is in the vicinity with respect to the one-stage stator vane 8 having shifted to the ventral side 8B of the one-stage stator vane 8, the axial chord M/L becomes larger than 0%, that is, the cooling hole 10 is formed on the dorsal side 8A than the leading edge 8a.

The axial chord M/L of the cooling hole 10 becomes a maximum at +10% when the relative position ratio S/P is +25%, and the axial chord M/L is larger than 0% until the relative position ratio S/P becomes +100%.

From the above, the position of the linking member 35 with respect to the one-stage stator vane 8 in the case of the stagnation line Y being formed at the leading edge 8a is analyzed in advance using computational fluid dynamics (CFD) analysis or the like, and with this analysis result serving as a reference, in the case of the relative position of the linking member 35 that is in the vicinity with respect to the one-stage stator vane 8 having shifted to the dorsal side 8A of the one-stage stator vane 8, the cooling hole 10 is formed in the ventral side 8B than the leading edge 8a, and in the case of having shifted to the ventral side 8B of the one-stage stator vane 8, the cooling hole 10 is formed in the dorsal side 8A than the leading edge 8a. Thereby, even if the stagnation line Y due to the combustion gas G1 shifts in position from the leading edge 8a to the ventral side 8B or the dorsal side 8A under the influence of the linking member 35, it becomes possible to form the cooling hole 10 on the ventral side 8B or the dorsal side 8A in accordance with this position shift, and so it is possible to effectively cool that stagnation line Y by the cooling gas from the cooling hole 10.

As shown in FIG. 6, in the present embodiment, in the case of the relative position ratio S/P having exceeded +100%, the axial chord M/L of the cooling hole 10 becomes smaller than 0%. Here, since the relative position ratio S/P in the graph shown in FIG. 6 is the relative position ratio S/P between the predetermined one-stage stator vane 8 and the predetermined linking member 35, in the case of the relative position ratio S/P being +100%, the one-stage stator vane 8 comes to be positioned midway between the predetermined linking member 35 and the other linking member 35 in the circumferential direction R of the turbine 4. When the relative position ratio S/P exceeds +100%, the one-stage stator vane 8 is nearer to the other linking member 35 that is positioned on the dorsal side 8A of the one-stage stator vane 8 than the predetermined linking member 35 that is positioned on the ventral side 8B of the one-stage stator vane 8. That is, the linking member 35 that is in the vicinity of the one-stage stator vane 8 changes from the predetermined linking member 35 that is positioned on the ventral side 8B of the one-stage stator vane 8 to the other linking member 35 that is positioned on the dorsal side 8A of the one-stage stator vane 8. As a result, at the one-stage stator vane 8, since the relative position of the linking member 35 that is in the vicinity with respect to the one-stage stator vane 8 (the other linking member 35 that is positioned on the dorsal side 8A, not the ventral side 8B, of the one-stage stator vane 8) shifts to the dorsal side 8A of the one-stage stator vane 8, with the position of the one-stage stator vane 8 with respect to the linking member 35 when the cooling hole 10 is formed in the leading edge 8a serving as a reference, the cooling hole 10 is formed on the ventral side 8B than the leading edge 8a.

Next, the stage efficiency in one stage of a turbine in which the one-stage stator vane cooling structure according to the present invention as shown above is applied shall be described. Note, stage efficiency means the ratio of the work that could actually be carried out to the work that is possible in one stage of an ideal turbine with no loss of the combustion gas G1.

Here, in the gas turbine 1 of the present embodiment, the linking members 35 are arranged with a mutually equal interval in the circumferential direction R of the turbine 4, and the one-stage stator vane 8 is provided in a number that is twice that of the combustors 3, and arranged with a mutually equal interval in the circumferential direction R of the turbine 4. Accordingly, by defining the relative positions of one one-stage stator vane 8 and one linking member 35 in the circumferential direction R, the positions of all of the other one-stage stator vanes 8 and all of the other linking members 35 in the circumferential direction R become defined. Furthermore, the distance S in the circumferential direction R between each of the plurality of one-stage stator vanes 8 that are alternately arranged in the circumferential direction R and the linking member 35 that is in the vicinity of each one-stage stator vane 8 mutually agrees for each of the one-stage stator vanes 8, that is, the relative position ratio S/P between each one-stage stator vane 8 and the linking member 35 that is in the vicinity of each one-stage stator vane 8 mutually agrees at each one-stage stator vane 8.

Figure 7:
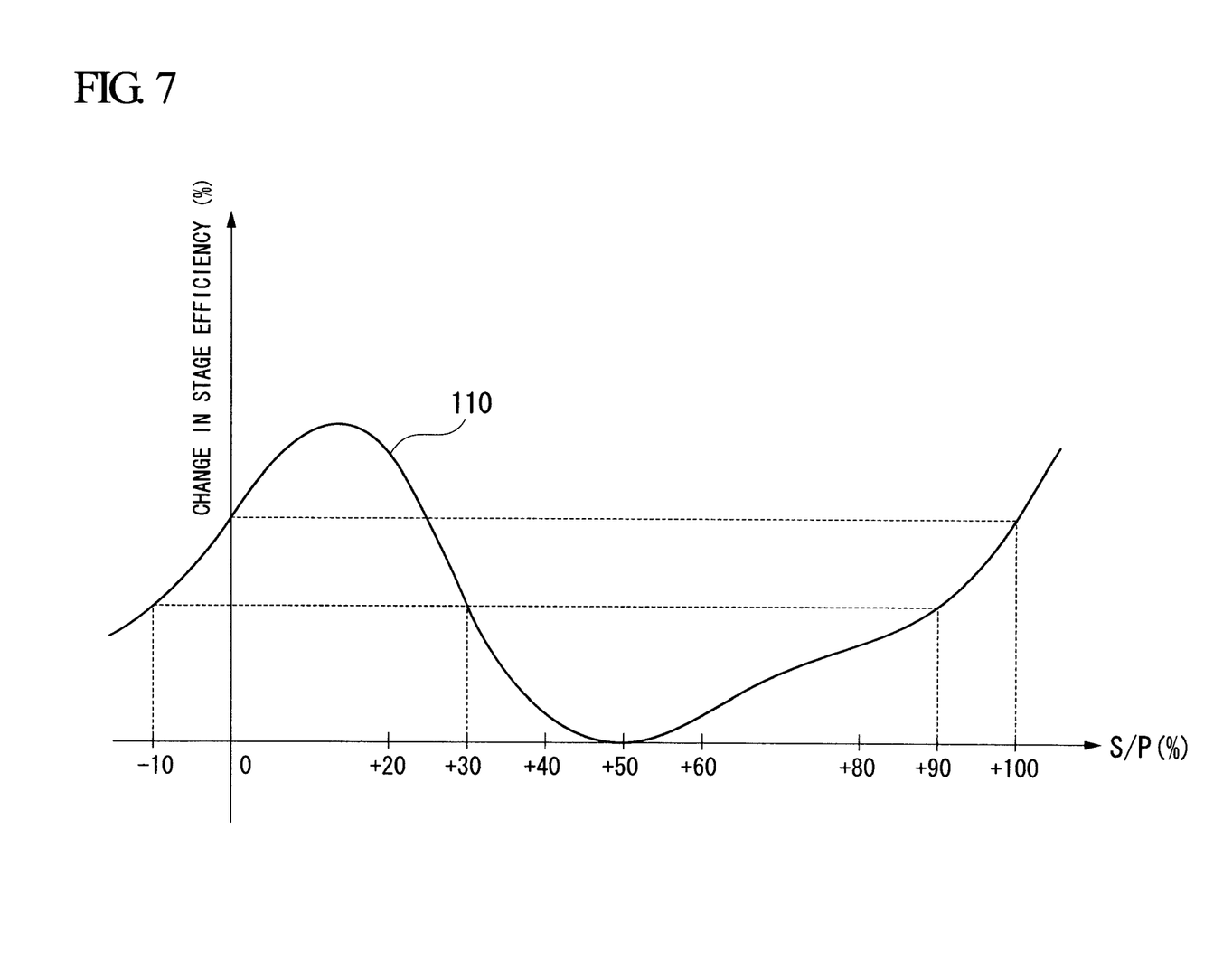
FIG. 7 is a graph that shows the relation between the relative positions of the one-stage stator vane and the linking member, and a change in the stage efficiency, in the one-stage stator vane of the gas turbine shown in FIG. 1.

In the process of causing the one-stage stator vane 8 and the linking member 35 to move relatively, from the position at which the leading edge 8a of the one-stage stator vane 8 that is arranged alternately in the circumferential direction R and the circumferential direction center position 35a of the linking member 35 that is in the vicinity of each one-stage stator vane 8 agree in the approximate circumferential direction R to the position at which the midway point in the circumferential direction R of the turbine 4 between the linking member 35 and the linking member 35 that is adjacent to that linking member 35 in the circumferential direction R and the leading edge 8a of the one-stage stator vane 8 agree in the approximate circumferential direction R, the description shall be given based on FIG. 7 for the relation between the relative position ratio S/P between the one-stage stator vane 8 and the linking member 35 and the stage efficiency. FIG. 7 is a graph that shows the relation between the relative positions of the one-stage stator vane and the linking member, and a change in the stage efficiency, in the one-stage stator vane of the gas turbine shown in FIG. 1.

With the stage efficiency when the relative position ratio S/P is 50% serving as a reference, the vertical axis of the graph shown in FIG. 7 shows the difference between this reference stage efficiency and the stage efficiency at each relative position ratio S/P.

As shown by the curved line 110 in FIG. 7, in the case of the present embodiment, when a plurality of the one-stage stator vanes 8 are alternately disposed in the circumferential direction R so that the relative position ratio S/P between the one-stage stator vane 8 and the linking member 35 in the vicinity of that one-stage stator vane 8 becomes greater than or equal to −10% and less than or equal to +30%, it is evident that the stage efficiency is high. This is considered due to being able to flow in to the one-stage stator vane 8 the wake flow that is generated at the back side of the rear end of the linking portion 35 by the combustion gas G1 that is flowed out from the combustor 3.

After putting the one-stage stator vane 8 and the linking member 35 into the aforementioned arrangement relation, by forming the cooling hole 10 at the position that is defined in accordance with the relative position with the linking member 35 in the vicinity of the one-stage stator vane 8, it is possible to enhance the stage efficiency, after effectively cooling the vicinity of the stagnation line Y of the one-stage stator vane 8.

In the gas turbine 1 of the present embodiment, the one-stage stator vane 8 was provided in a number that is twice the number of the combustors 3, but is not limited to that. For example, provided that the one-stage stator vane 8 is provided in a number that is an integer multiple of the combustors 3 (n times, however n is an integer of 1 or more), and the relative position ratio S/P of the one-stage stator vane 8 that is closest to (in the vicinity of) the linking member 35 in the circumferential direction R becomes greater than or equal to −10% and less than or equal to +30% (that is, the relative position ratio S/P at each of the n number of one-stage stator vanes 8 in the circumferential direction R is greater than or equal to −10% and less than or equal to +30%), it is possible to enhance the stage efficiency of one stage of the turbine.

The technical scope of the present invention is not limited to the embodiment, and various modifications can be added within the scope that does not depart from the scope of the present invention.

For example, the shape, number, and arrangement of the one-stage stator vane 8, and the number of cooling holes 10 in the gas turbine 1 shown in the embodiment were examples, and are not limited thereto.

The graph shown in FIG. 6 is an example that shows the relation between the relative position ratio S/P and the axial chord M/L of the cooling hole 10, and the relation of both suitably change depending on the flow amount of the combustion gas G1 that is led from the combustor 3 to the transition pipe 32, the shape of the one-stage stator vane 8, the number of cooling holes 10, and the distance along the axial line direction D between the linking member 35 and the one-stage stator vane 8. In the one-stage stator vane cooling structure according to the present invention, the axial chord M/L of the cooling hole 10 is considered to change within a range of for example +5% to +15% in the case of considering various conditions such as the shape of the one-stage stator vane in a common gas turbine.

The gas turbine 1 is not limited to the aspect shown in the aforementioned embodiment. For example, in the embodiment, the axial-flow compressor 2 was adopted as the compressor, but a centrifugal compressor may also be adopted. Also, in the embodiment, as the gas turbine 1, a single-shaft type was adopted, but a multi-shaft type (free turbine) may also be adopted.

In addition, replacing the constituent elements in the embodiment with widely known constituent elements is appropriately possible, and the aforementioned modifications may be suitably combined.

Industrial Applicability

According to the one-stage stator vane cooling structure and the gas turbine that is provided with this one-stage stator vane cooling structure of the present invention, it is possible to effectively cool in the vicinity of the stagnation line of the one-stage stator vane.

DESCRIPTION OF REFERENCE NUMERALS

1 Gas turbine
2 Compressor
3 Combustor
4 Turbine
5 Turbine stator vane
6 Turbine rotor vane
8 One-stage stator vane
8a Leading edge of one-stage stator vane
8A Dorsal side of one-stage stator vane
8B Ventral side of one-stage stator vane
10 Cooling hole
35 linking member
G1 Combustion gas
R Circumferential direction of turbine
Y Stagnation line

The invention claimed is:

1. A one-stage stator vane cooling structure comprising:
a plurality of linking members that are provided between a plurality of combustors disposed in a circumferential direction of a gas turbine; and
cooling holes that are provided in each one-stage stator vanes to discharge a cooling gas from an inside to an outside of the one-stage stator vanes in order to cool a stagnation line formed on or near a leading edge of the one-stage stator vanes by means of stagnation of combustion gas flowing in from the plurality of combustors,
wherein the cooling holes are formed at positions that are determined according to relative positions of the one-stage stator vanes and the linking members disposed in a vicinity of the one-stage stator vanes,
wherein a pressure surface side of the one-stage stator vanes has a concave surface between the leading edge and a trailing edge,
wherein the plurality of linking members are arranged with a mutually equal interval in a circumferential direction of the gas turbine,
wherein the one-stage stator vanes of a number that is an integer multiple of a number of the combustors are arranged with a mutually equal interval in the circumferential direction of the gas turbine, and
wherein the one-stage stator vanes that are closest in the circumferential direction of the gas turbine to the linking members are disposed so that a relative position ratio S/P that is a ratio of S to P becomes greater than or equal to −10% and less than or equal to +30%, where P and S are as follows:
P: a pitch of a distance between two successive one-stage stator vanes in the circumferential direction of the gas turbine, and
S: a distance in the circumferential direction of the gas turbine of a center position of the linking member in the circumferential direction that is in a vicinity with respect to the leading edge of the one-stage stator vane, the distance being a negative value in a case of the linking member that is in the vicinity shifting to a dorsal side of the one-stage stator vane, and a positive value in the case of the linking member that is in the vicinity shifting to a ventral side of the one-stage stator vane.

2. A gas turbine comprising:
a compressor that generates compressed air;
a turbine that has a stator vane and a rotor vane of at least one stage each, and generates rotative power by combustion gas; and
a plurality of combustors that are disposed in a circumferential direction of the turbine, linked by a plurality of linking members that are provided in spaces therebetween, and that supply to the turbine combustion gas that is generated by supplying fuel to the compressed air that is supplied from the compressor, wherein the one-stage stator vane cooling structure according to claim 1 is provided in the one-stage stator vane that is positioned most to the combustor side among the stator vanes of the turbine.

\* \* \* \* \*